Nov. 29, 1955 — R. A. MITCHELL — 2,725,015
DEVICE FOR FLOWING FLUID FROM WELLS
Filed April 28, 1952 — 5 Sheets-Sheet 3
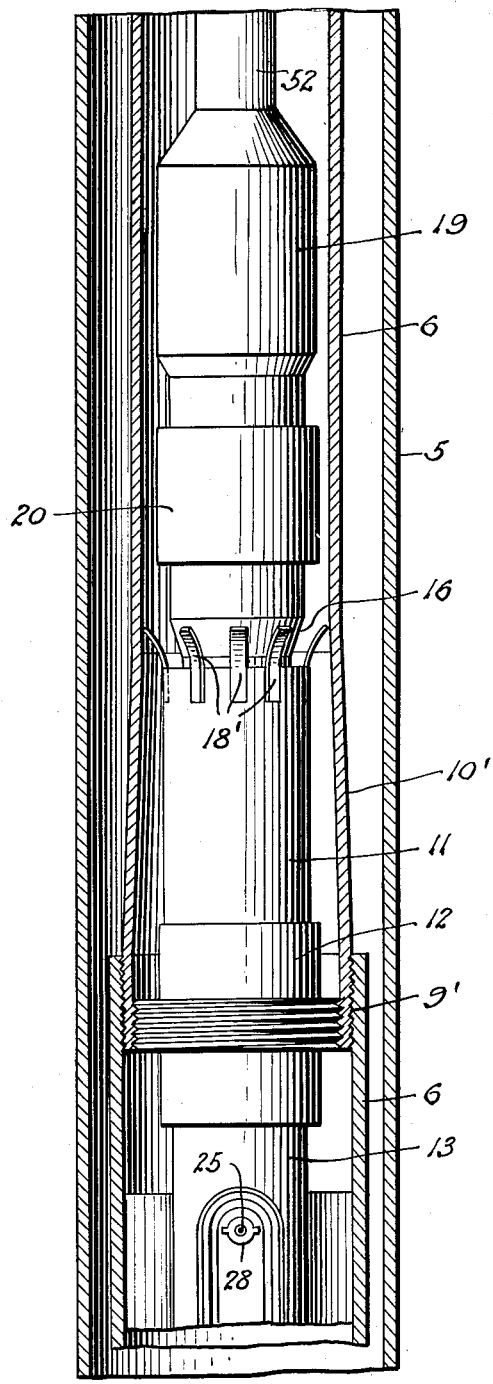
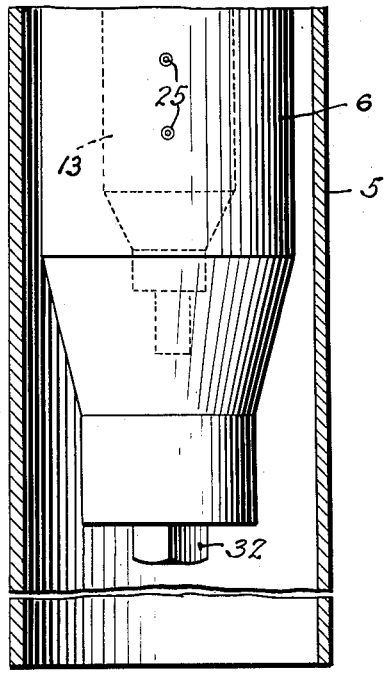
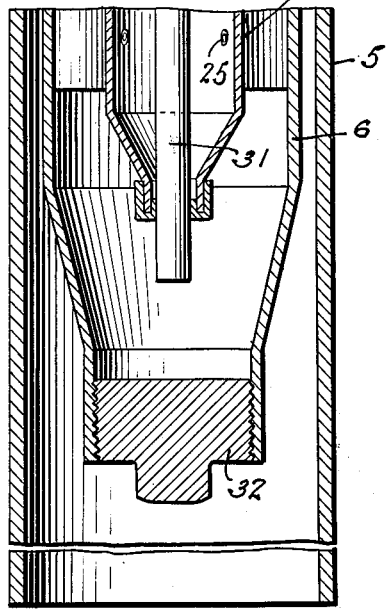
R. A. Mitchell INVENTOR Nov. 29, 1955
R. A. MITCHELL
2,725,015
DEVICE FOR FLOWING FLUID FROM WELLS
Filed April 28, 1952
5 Sheets—Sheet 4
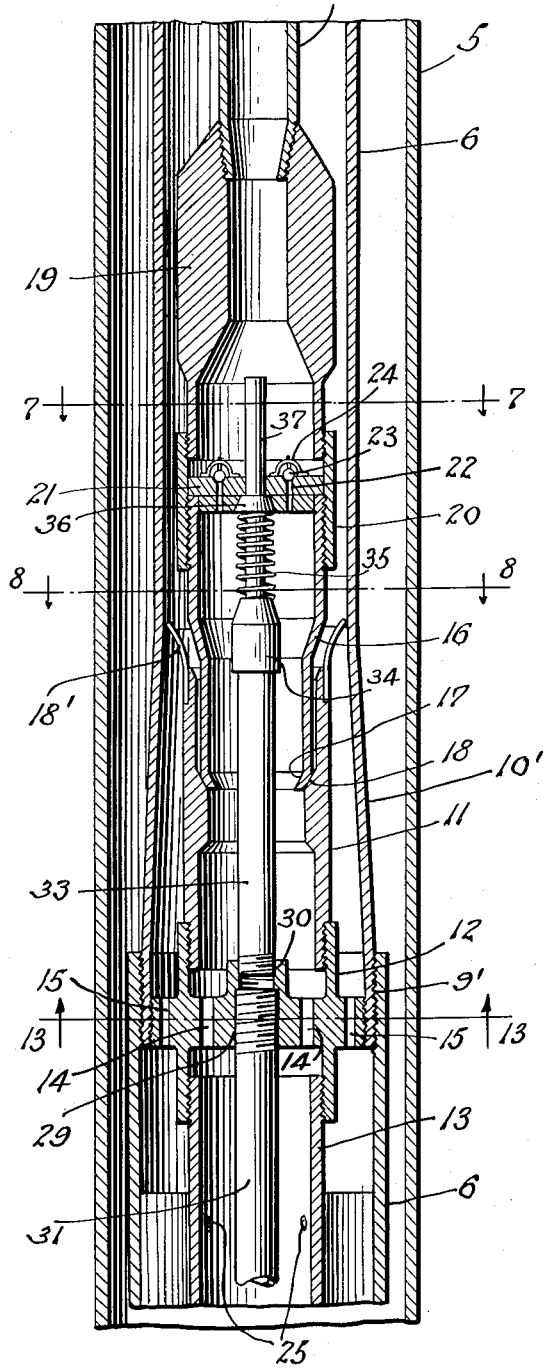
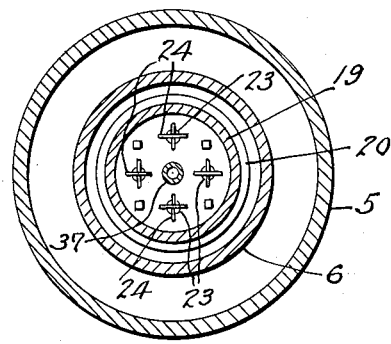
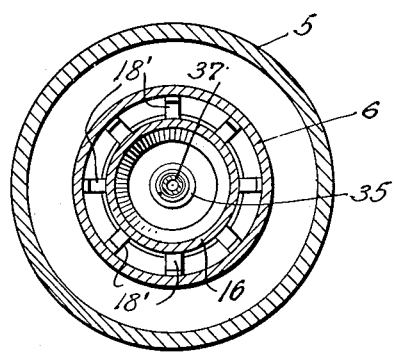
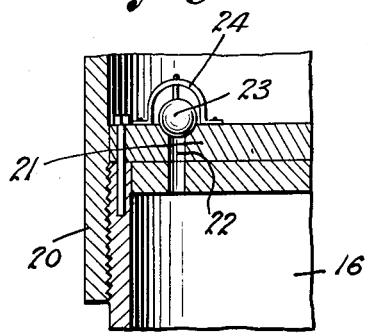
R. A. Mitchell
INVENTOR
BY *Cahnow Ves.*
ATTORNEYS Nov. 29, 1955 R. A. MITCHELL 2,725,015
DEVICE FOR FLOWING FLUID FROM WELLS
Filed April 28, 1952 5 Sheets-Sheet 5
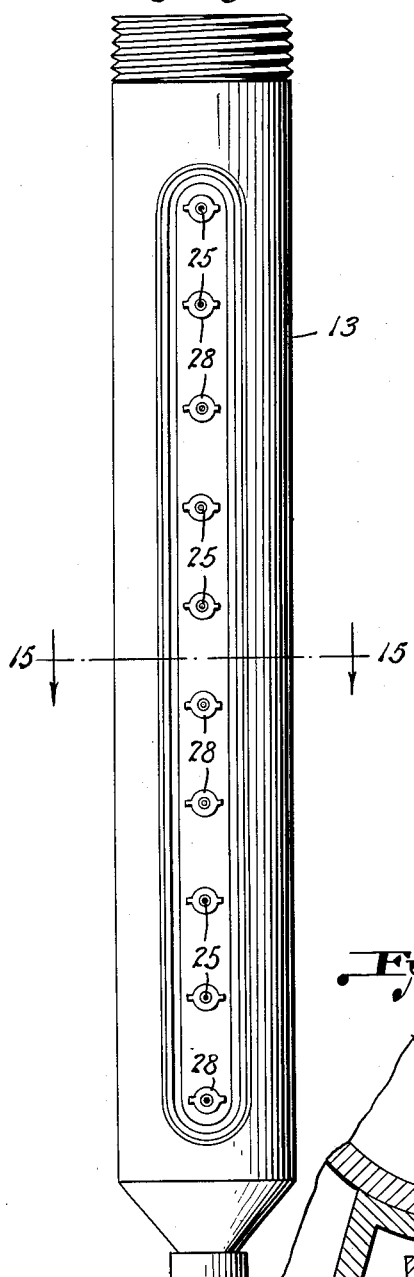
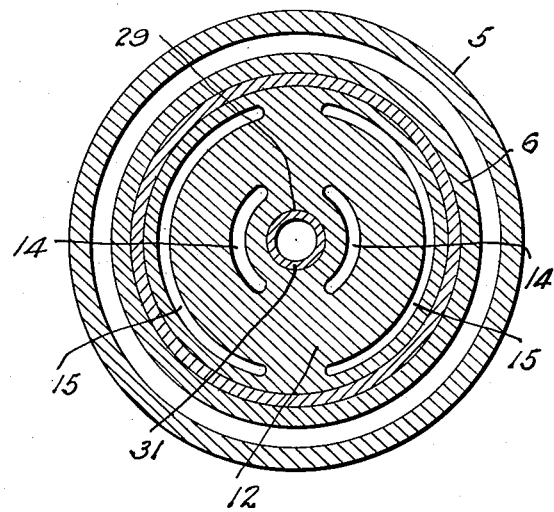
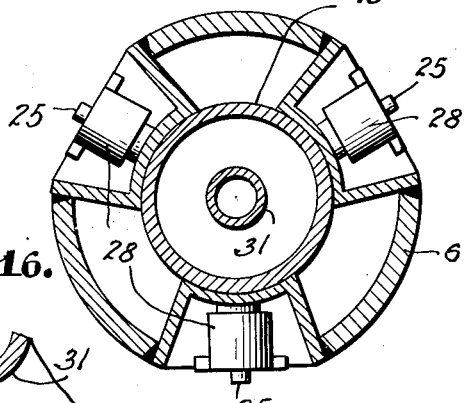
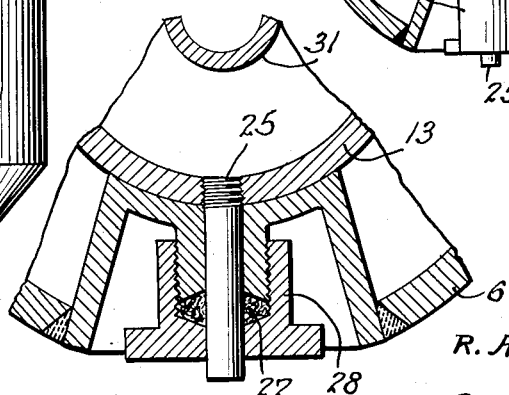
R. A. Mitchell
INVENTOR
BY *CA Snow & Co.*
ATTORNEYS.

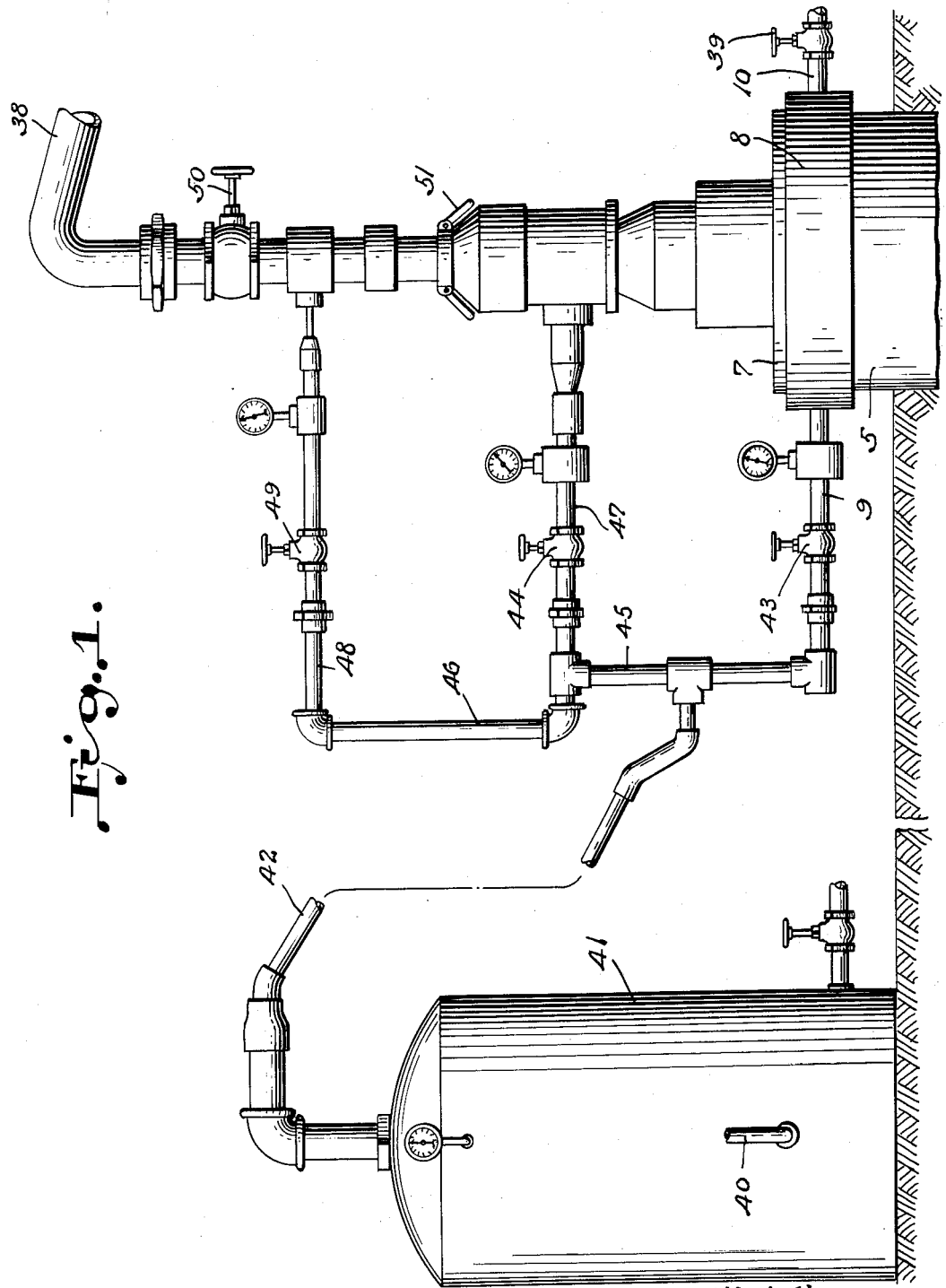

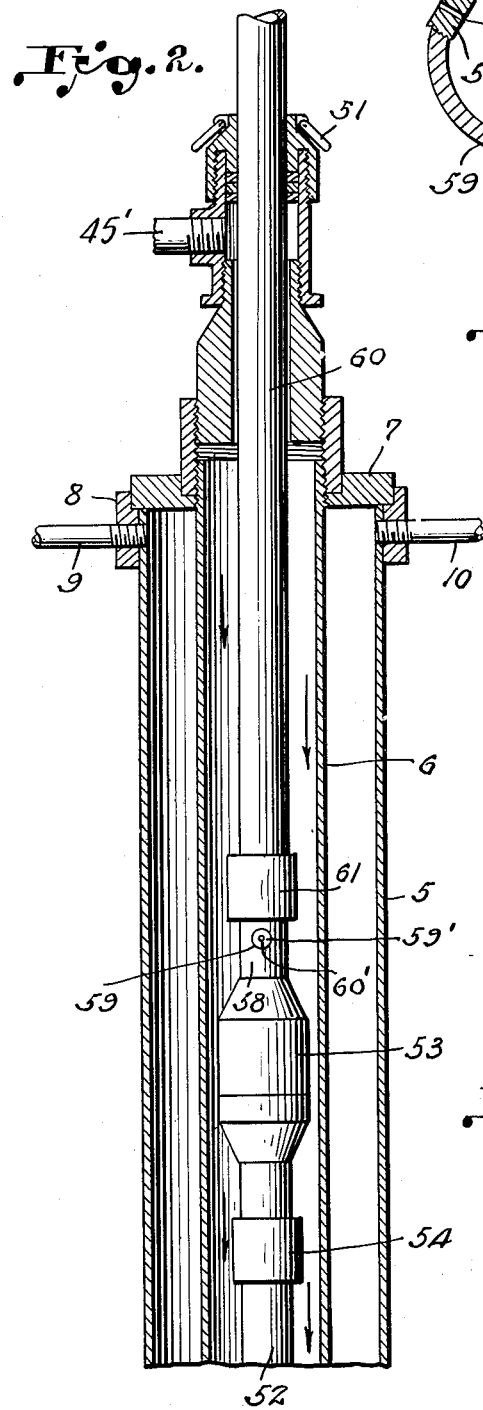
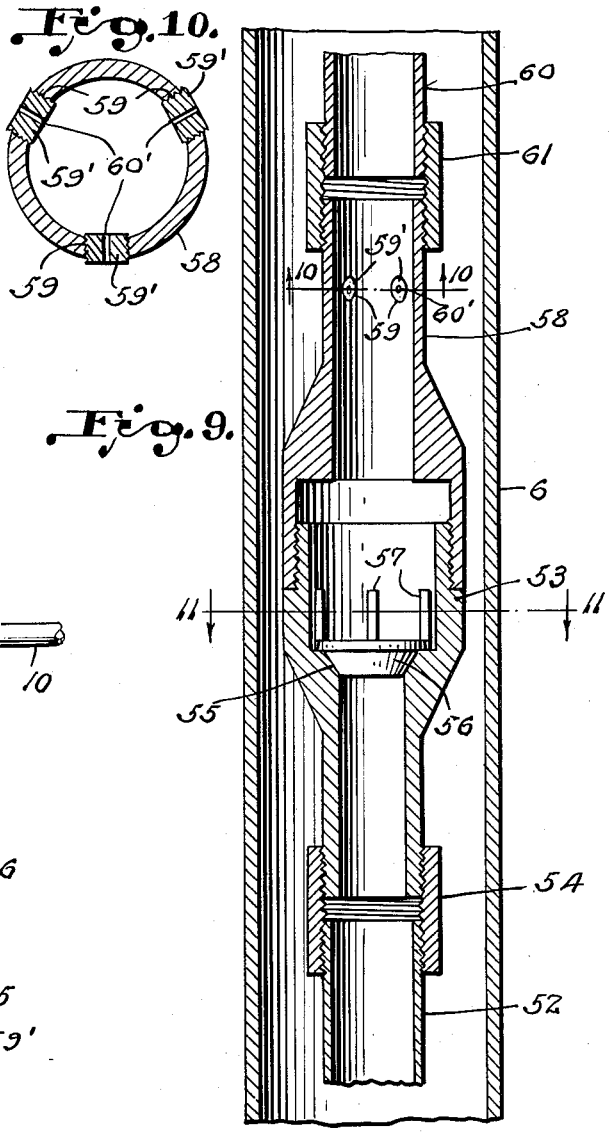
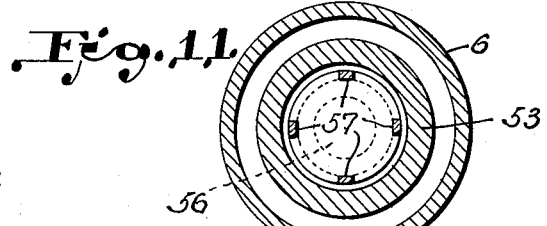

United States Patent Office 2,725,015
Patented Nov. 29, 1955

2,725,015

DEVICE FOR FLOWING FLUID FROM WELLS

Roscoe A. Mitchell, Bowling Green, Ky.

Application April 28, 1952, Serial No. 284,705

2 Claims. (Cl. 103—260)

This invention relates to a device designed to flow a large volume of water from wells with extremely low pressure and at minimum cost, by the use of compressed air or natural gas, which may be available at the place of operation.

An object of the present invention is to provide a device which is so designed that the air or gas is equalized throughout the depth of the well.

A further object of the invention is to provide means for separating gas from the oil in the well, when the well is emitting natural gas from the formation, the gas being removed from the well, separately from the regular flow of fluid.

Still another object of the invention is to provide a fluid retrieving device which will remove oil from a well by jet action, thereby eliminating the necessity of utilizing extreme air pressure working against the oil bearing formation to lift the fluid, which system, because of the extreme air pressure, tends to retard the normal flow of oil into the well.

Still another object of the invention is to provide a device wherein hot air may be circulated through the well tubing to melt paraffin deposits on the tubing, eliminating the necessity of pulling the tubing and rods to subject the tubing and rods to heat to melt the paraffin.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is a view illustrating the end of the device above the ground surface illustrating the compressed air tank in communication with the device to supply compressed air thereto.

Fig. 2 is a longitudinal sectional view through the upper portion of the device.

Fig. 3 is a longitudinal sectional view through the portion of the device directly below the structure shown by Fig. 2.

Fig. 4 is a sectional view through the well casing illustrating the lower end of the device.

Fig. 5 is a vertical sectional view through the portion of the device shown by Fig. 4.

Fig. 6 is a longitudinal sectional view through the upper portion of the inner section of the device.

Fig. 7 is a sectional view taken on the line 7—7 of Fig. 6.

Fig. 8 is a sectional view taken on line 8—8 of Fig. 6.

Fig. 9 is a longitudinal sectional view through a portion of the device below the lower end of the device, as shown by Fig. 5.

Fig. 10 is a sectional view taken on line 10—10 of Fig. 9.

Fig. 11 is a sectional view taken on line 11—11 of Fig. 9.

Fig. 12 is an enlarged fragmental sectional view illustrating the detail structure of one of the valves.

Fig. 13 is a sectional view taken on line 13—13 of Fig. 6.

Fig. 14 is an elevational view of one portion of the inner section of the device.

Fig. 15 is a sectional view taken on line 15—15 of Fig. 14.

Fig. 16 is an enlarged detail view of the section illustrated by Fig. 14 in elevation.

Referring to the drawings in detail, the device embodies an outer well casing 5 within which the inner casing 6 is mounted, the inner casing 6 being supported by the supporting ring 7, which is provided with threads into which the inner casing is threaded. Directly under the supporting ring 7 is the band 8 formed with threaded openings to receive the pipes 9 and 10.

The well casing 5 may be of any desired length and is made up of a number of sections, the sections being threaded together in the usual and well known manner.

The inner casing 6 embodies a plurality of tubular members of predetermined lengths threaded together at 9', the lower end of each section of the inner casing 6 being flared at 10' to provide means for guiding the lower ends of the inner casing sections over the inner pipes 11 of the device. The inner pipes 11 have their lower ends threaded into the couplings 12 which connect the pipes 11 with the lower pipe sections 13 associated therewith, the coupling 12 acting as a fastener between the sections 6 of the inner casing and the pipes 11 and 13, the couplings also having openings 14 establishing communication between the adjacent pipes 11 and 13 so that fluid may pass therebetween. The couplings 12 also have openings 15 that establish communication between the space between the sections of the inner casing 6, and pipes 11 and 13. Each of the pipes 11 provides a guide for a valve tube 16 which has its lower end extended inwardly at 17 and fitted against the inclined edge 18 of the inner pipe 11. Laterally extended spring fingers 18' are mounted on the upper end of the inner pipe 11 and also provide means for guiding the valve tube 16 in a position within the pipe 11 associated therewith.

The valve tube 16 is connected with the splash nipple 19 by means of the threaded union 20, which threaded union 20 provides a mounting for the disc valve 21 formed with openings 22 through which fluid passes, the upper ends of the openings 22 providing seats for the ball bearing valves 23 operating within the cages 24 that hold the ball valves against moving laterally on the disc valve 21.

The pipe section 13 is provided with vertical rows of spaced openings into which the threaded ends of pipes 25 extend, the pipes 25 having their other ends disposed within the space between the well casing 5 and inner casing 6, so that oil may find its way from the space between the well casing 5 and inner casing 6, into the pipe section 13, there being provided packing 27 and packing glands 28 for insuring a fluid tight connection between the pipes 25 and the space between the well casing 5 and inner casing 6.

The couplings 12 have threaded central openings 29 and 30, the opening 29 of each coupling 12 accommodating the upper end of the pipe 31 that extends to the lower end of the section 6 to receive air therefrom, the lower end of the section 6 being closed by means of the plug 32.

The pipe 33 is connected with the coupling 12 and is in communication with the pipe 31, the upper end of the pipe 33 having an enlargement 34 formed thereon, which enlargement provides a seat for the coiled spring 35 which bears against the back pressure valve 36 to normally urge the valve 36 to its seat. The valve 36 is mounted on the pipe 37 which slides within the pipe 33. This pipe 37 also extends through valve member 21 and terminates a substantial distance above the valve member 21, the upper end of the pipe 37 terminating at a point within the lower end of the splash nipple, so that air under pressure directed through the pipe 37 will create a suction through the openings 22 of the valve member 21 to draw liquid upwardly through the openings 22, unseating the valves 23 and discharging the fluid through the pipe 52 and discharge pipe 38 which is in communication with a suitable tank as shown. The pipe 10 leads from a compressor, not shown, and through this air pressure is directed to the space between the well casing 5 and casing 6, the air passing to the bottom of the inner section. The passage of compressed air through the pipe 10 is controlled by the valve 39.

The pipe 40 which extends into the compressed air tank 41 supplies air from a compressor to said tank 41, where the air may be heated and delivered to the device, through the pipe 42 and pipe 9, the valve 43 controlling the passage of warm air to the device.

When the device is being used in retrieving oil from wells having paraffin deposits, it may be desirable to direct hot air to the device to melt the paraffin deposits which would otherwise retard the operation of the device to accomplish its purpose. When it is desired to use compressed air from the tank 41 where it is unnecessary to supply heated air, the valve 43 is closed and valve 44 opened to permit air to flow through the pipe 45' into the device from which the air passes downwardly, as indicated by the arrows in Fig. 2 of the drawing.

The pipe 46 connects with pipe 47, that in turn forms a continuation of the pipe 45 so that air under pressure may pass upwardly through pipes 45 and 46, when the valve 44 has been closed. Pipe 46 connects with pipe 48 that extends into the inner casing 6 to direct air downwardly through the inner casing 6 to the lower end thereof, as described.

Valve 49 controls the passage of air under pressure through this pipe 48 to the inner casing 6.

The control valve 50 controls the passage of fluid through the discharge pipe 38.

In order that the device may be readily set up, and the sections of the inner casing rotated to properly thread them together, pivoted arms 51 are provided on the upper section of the inner casing 6, which arms may be swung upwardly and gripped, the arms providing means for rotating the section of the inner casing to which it is connected.

The lower end of the pipe 52 is tapered and fits into the tapered upper end of the splash nipple 19, the pipe 52 being connected with the valve housing 53 by means of the collar 54, the valve housing 53 having the valve seat 55 against which the valve 56 seats by gravity, to prevent fluid which has passed upwardly within the valve housing 53 from returning to the bottom of the well. Guides 57 are formed on the valve 56 and provide means for guiding the valve in its movements.

The valve housing 53 embodies separable sections, the uppermost section of the valve housing embodying the extension 58 which is formed with openings 59 on which the plugs 59' are held, which constitute air return openings, said plugs having openings 60' through which air passes into the extension 58 and upwardly through the pipe 60, which connects with the extension 58 by means of the threaded collar 61.

In the operation of the device the device is assembled and suspended at the bottom of the well. The oil will flow into the casing 5 and then into the lower pipe section 13 through the pipes 25 and pass upwardly through the openings 14 into the valve tube 16, from which the oil will pass into the splash nipple 19, through the openings 22 of the valve member 21, unseating the ball valves 23.

Air under pressure at the same time is entering the inner casing 6, the compressed air being supplied from the tank 41, where it passes through the pipe 42, entering the inner casing 6 at the upper end thereof. This air under pressure passes downwardly to the bottom of the pipe 52, circulating around the pipes 25. The air then enters the lower end of the pipe 31 from where the air passes upwardly through the pipes 31 and 33 and is directed into the splash nipple 19 through the pipe or nozzle 37, forcing oil upwardly through the pipe 52. The pipe 38, which is the discharge pipe, connects with the upper end of the pipe 52 so that the oil which is removed from the well by this jet action, may be carried off to a place of deposit.

Having thus described the invention, what is claimed is:

1. A fluid elevating apparatus adapted to be partially submerged in the fluid of a well, comprising an outer well casing into which fluid flows from the well, an inner concentric casing having a closed lower end disposed within the well casing in spaced relation therewith providing a fluid passageway between the outer well casing and inner casing, an inner tubular member comprising a plurality of connected pipe sections including a lower pipe section, said lower pipe section having a closed lower end, means for securing said inner tubular member within and spaced from said inner casing, a plurality of vertically spaced horizontal flow pipes extending transversely through the space between said inner casing and said inner tubular member, said horizontal flow pipes being connected in fluid communication between said space defined by said casing and said lower pipe section through which well fluid flows into said lower pipe section and inner tubular member, means for supplying air pressure to the space between said inner casing and said inner tubular member, means for directing said air pressure upwardly through said inner tubular member creating pressure within said inner tubular member, forcing liquid upwardly through the top of the well and valves in said inner tubular member for preventing the return of well fluid from said inner tubular member through said horizontal flow pipes.

2. The subject matter as claimed in claim 1, wherein said last mentioned means comprises a vertical air pipe disposed within said inner tubular member, a splash nipple forming a part of said inner tubular member into which said air pipe discharges air whereby fluid is forced upwardly into said inner tubular member and a pipe connected at the upper end of said last mentioned member through which fluid discharges from said well.

References Cited in the file of this patent

UNITED STATES PATENTS

| | | |
|---|---|---|
| 1,737,894 | Reynolds | Dec. 3, 1929 |
| 1,763,030 | Wolfe | June 10, 1930 |
| 2,612,111 | Humason | Sept. 30, 1952 |